INVENTORS
ROBERT A. SIMONNEAU & MICHEL M. ROUZIER
BY
Abraham A. Saffitz
ATTORNEY INVENTORS
ROBERT A. SIMONNEAU & MICHEL M. ROUZIER
BY
Abraham A. Saffitz
ATTORNEY

MULTI-LEVEL PRINTED CARDS FOR ELECTRONIC SWITCHING EQUIPMENT

Filed Jan. 21, 1964 4 Sheets-Sheet 3

INVENTORS
ROBERT A. SIMONNEAU & MICHEL M. ROUZIER
BY
Abraham A. Saffitz
ATTORNEY

MULTI-LEVEL PRINTED CARDS FOR ELECTRONIC SWITCHING EQUIPMENT

Filed Jan. 21, 1964

4 Sheets-Sheet 4

INVENTORS

ROBERT A. SIMONNEAU & MICHEL M. ROUZIER

BY

Abraham A. Saffitz

ATTORNEY

United States Patent Office 3,238,420
Patented Mar. 1, 1966

3,238,420

MULTI-LEVEL PRINTED CARDS FOR ELECTRONIC SWITCHING EQUIPMENT

Robert A. Simonneau, Lannion, and Michel M. Rouzier, Vauhallan, France, assignors to the "Société" Mixte pour le Development de la Technique de la Commutation dans le Domaine des Telecommutations styled Socotel, Issy-les-Moulineaux, France, a French company Filed Jan. 21, 1964, Ser. No. 339,249
Claims priority, application France, Jan. 26, 1963, 922,780
3 Claims. (Cl. 317—101)

This invention relates to multi-level printed cards for connecting a plurality of aligned input terminals to a plurality of the same number of likewise aligned output terminals respectively associated with the input terminals, the input and output terminals being arranged in their respective alignments according to an imposed order.

In switching problems, two-terminal circuit assemblies are frequently encountered with active or passive elements leading respectively from aligned input terminals and leading to aligned output terminals, wherein the active or passive elements must have a spatial matrix distribution or, in other terms, be disposed substantially at the points of intersection of parallel lines and parallel columns perpendicular to the lines and wherein there is also a mixing or grading between the input and output terminals. In order that these circuit assemblies may occupy a restricted space, it is advantageous that they should be made—except for the active or passive elements—in the form of printed circuits on cards and to dispose the input and output terminals along two alignments on the front and back of the card near the edge of the same. The circuit assembly can then be inserted or removed like a page in a releasable binder, the page being formed by the printed card, and the releasable binder by an elongated connector bearing two series of aligned contacts which bear on the card terminals.

The object of the invention is to provide a multi-level printed card for two-terminal circuit assemblies comprising active or passive elements, wherein the input and output terminals form parallel alignments and the active or passive elements form a matrix. As examples of circuit assemblies in which the multi-level printed card according to the invention can be used we may cite the circuits formed by telephone distributors and the subscribers line protective elements, protective fuses and heat coils, and the grading networks between electronic switch selection stages and their associated test elements. In the former case, the input terminals of the circuits are the terminals on the subscribers' side of the distributor, the output terminals are the terminals on the switching network side of the distributor and the active or passive elements are the protective and break elements formed, for example, by switches arranged matrix-fashion and controlled by line and column. In the second case, the input terminals of the circuits are connected to the output terminals of the switches of one stage, for example the subscriber selection stage, and the output terminals are connected to the input terminals of the next selection stage, for example the first group selection stage, and the active or passive elements are test elements inserted in the interstage junction lines which form a grading network and which are tested by line and column to know the service condition, idleness or occupation, of the junctions on which they are inserted.

Hereinafter the case of a grading network will be taken as an example and it will be assumed—although this is not restrictive—that the test elements are magnetic cores. It will be recalled that the junctions of a grading network enable $m$ groups of $n$ input terminals to be connected to $n$ groups of $m$ output terminals so that the input terminal of rank $i$ of the group of rank $k$ is connected to the output terminal of rank $k$ of the group of rank $i$.

The $m$ x $n$ input terminals of the grading network are connected, outside the multi-level printed card, to the telephone switching network outputs of a first selection stage and the $n$ x $m$ output terminals are connected inside the card according to the invention to $n$ x $m$ wires of the test matrix. Since these wires are the line wires to which a potential or marking current is applied in the case of occupation, they will also be referred to as the matrix junction wires. These $n$ x $m$ junctions, after having passed through the holes of the magnetic cores forming the points of intersection of the matrix, are connected to $n$ x $m$ output terminals which are in turn connected, outside the multi-level printed card, to the telephone switching network inputs of a second selection stage.

It will therefore be seen that the multi-level card comprises $m$ x $n$ input terminals of the grading network, $n$ x $m$ output terminals of the grading network which are at the same time the $n$ x $m$ input terminals of the test matrix and $n$ x $m$ output terminals of the test matrix. The test matrix has $n$ lines and $m$ columns.

According to the invention, the multi-level printed card comprises three superposed levels or cards. The middle or main card comprises two rows of aligned terminals respectively disposed on the front and back of said card near a side of the same, these terminals respectively being the input terminals of the grading network and the output terminals of the matrix, a first plurality of pins perpendicular to the card on one surface thereof and disposed as a matrix network, some of the pins of the first plurality passing beyond the two surfaces of the card, a second plurality of pins perpendicular to the same surface of the card and disposed in an alignment along the opposite side to the side containing the terminals and a third plurality of pins perpendicular to the other surface of the card and disposed in an oblique alignment in relation to the sides, a first plurality of printed connections on one surface of the card between some of the input terminals situated on the said surface and the heads of the pins of the first plurality extending beyond only one of the surfaces of the card, a second plurality of printed connections on the other surface of the card between the output terminals situated on the said surface and the heads of the pins of the second plurality and a third plurality of printed connections on the same surface of the card as the first plurality between some of the input terminals situated on the said surface and the heads of the pins of the third plurality. The second card has apertures through which the pins of the first plurality pass and, after passing therethrough, extend slightly beyond the card level, a fourth plurality of pins respectively near the pins of the first plurality, a pin of the first plurality and an adjacent pin of the fourth plurality forming two uprights to support an active or passive element, fixing points for the pins of the second plurality, a fourth plurality of connections printed on the card between the heads of the pins of the fourth plurality and the fixing points of the pins of the second plurality, and a plurality of active or passive elements each supported by two adjacent pins, one of the first plurality and the other of the fourth plurality. The third card comprises fixing points for the pins of the third plurality, fixing points for those of the pins of the first plurality which extend beyond the first card on the two surfaces thereof and a fifth plurality of printed connections between the fixing points of the pins of the third plurality and the fixing points of the pins of the first plurality. This third card or small auxiliary card is used for making some of the connections of the first plurality of connections which cannot all be printed on the first card without the risk of intersection.

In other words—

The main card bears:

On the front: the connections for the grading circuit which do not intersect, and some of those which do intersect (connections of the first plurality). All these connections lead from the side of the card on which are printed the input terminals of the grading circuit in contact with the connector.

The connections which do not intersect lead to pins fixed on said main card (pins of the first plurality) and passing through the same and through circular apertures formed in the second card associated with the test matrix (test matrix input terminals).

The connections which intersect other connections lead to the pins of the third plurality which connect them to the small auxiliary card.

On the back: parallel connections starting, perpendicularly to the side of the card at which the test matrix output terminals are printed, from said terminals and leading at the other end to connections (pins of the second plurality) connecting them on the front of the test matrix card (output terminals of the matrix on the latter card).

The small auxiliary card fixed to the main card printed solely on the front bears connections of the grading circuit which would intersect other connections if they were printed on the main card (connections of the fifth plurality) and thus provides jumper connections for the grading circuit. The connection to the first parts of said connections is made at one of the edges of this small card by the pins of the third plurality. The other end of the connections borne by this same small card is soldered to pins which pass through circular apertures in the main card and the second card associated with the test matrix (second part of the test matrix input terminals).

The second card bears:

On the front: connections (connections of the fourth plurality) connected:

Firstly, to the printed connections on the back of the main card by the pins of the second plurality.

Secondly, to the small pins of the fourth plurality which pass through this second card to hold one of the ends of the junction wires of the cores of the test matrix. The other ends of these junction wires are respectively fixed to the pins of the first plurality;

On the back: the active or passive test elements of the circuits, in this case the cores held by the junction wires (wires to be tested) and through which extend also the line and column wires of the matrix for designating a given core by its line address and its column address and the reading wire.

The invention will now be described in detail with reference to the accompanying drawings wherein.

Figures 2, 7, 8:
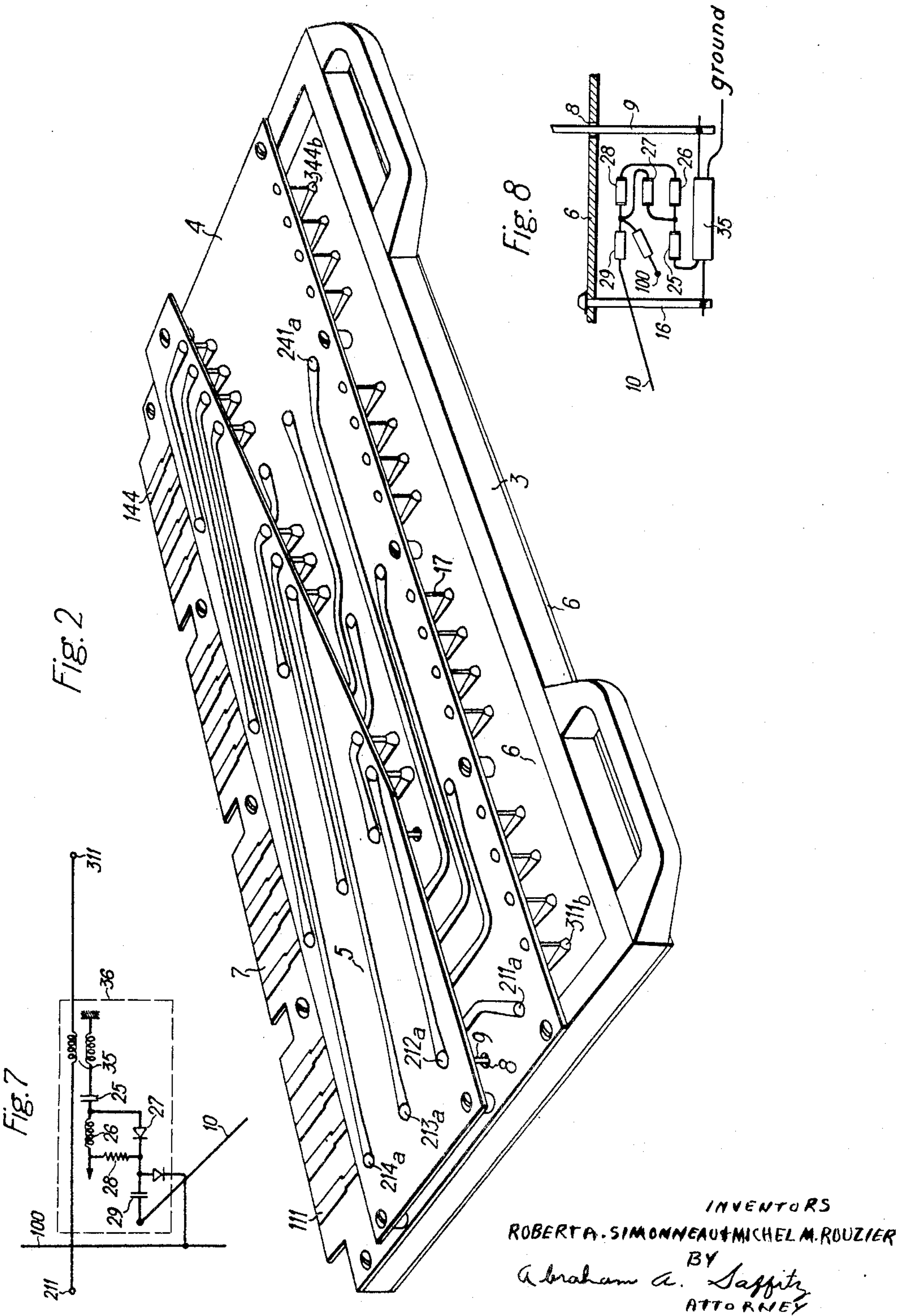
FIG. 2 is a perspective of the multi-level printed card.
Figures 3, 5:
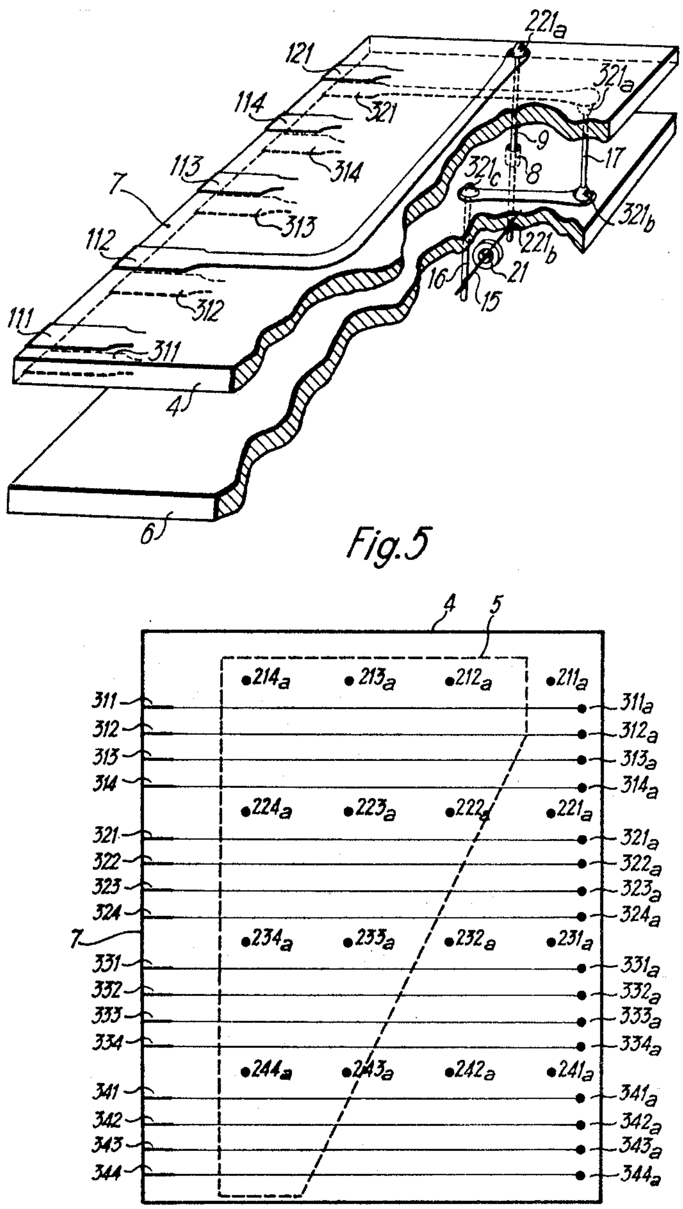
FIG. 3 is a simplified perspective view to explain the way in which the various circuit paths are made up.
Figure 4:
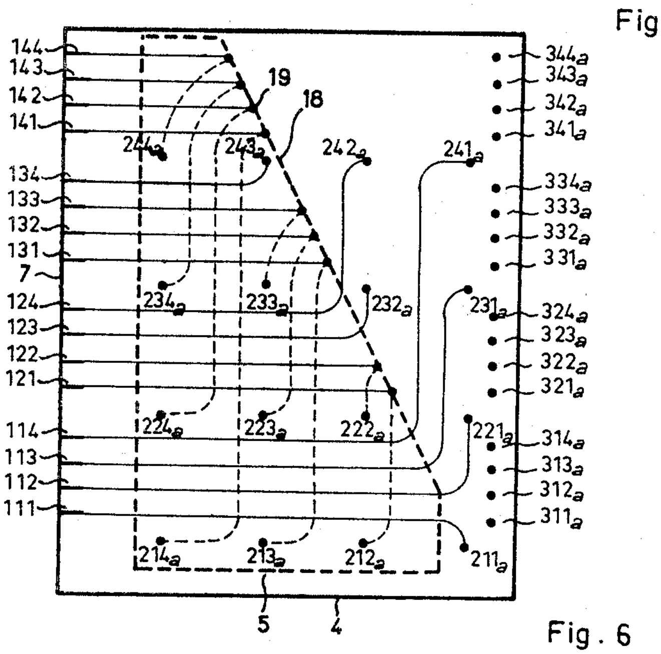
Figure 6:
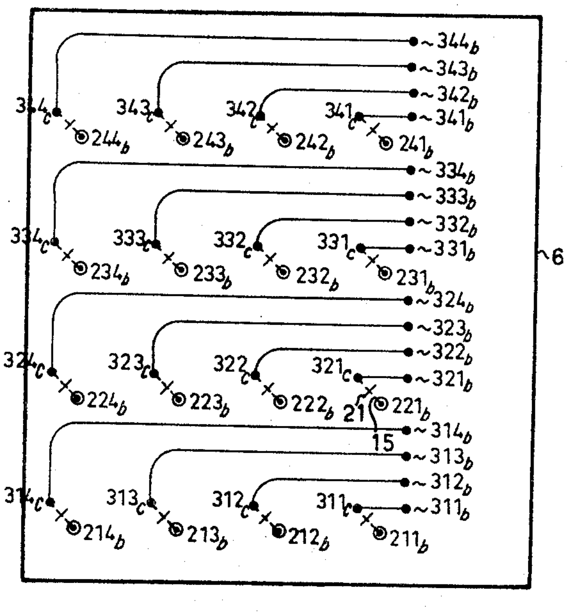

FIGS. 4, 5 and 6 respectively show the connections extending over the front of the main card, the back of the main card, and the front of the secondary card; and FIGS. 7 and 8 show a variant of the test matrix in which the test elements are no longer magnetic cores.

Figure 1:
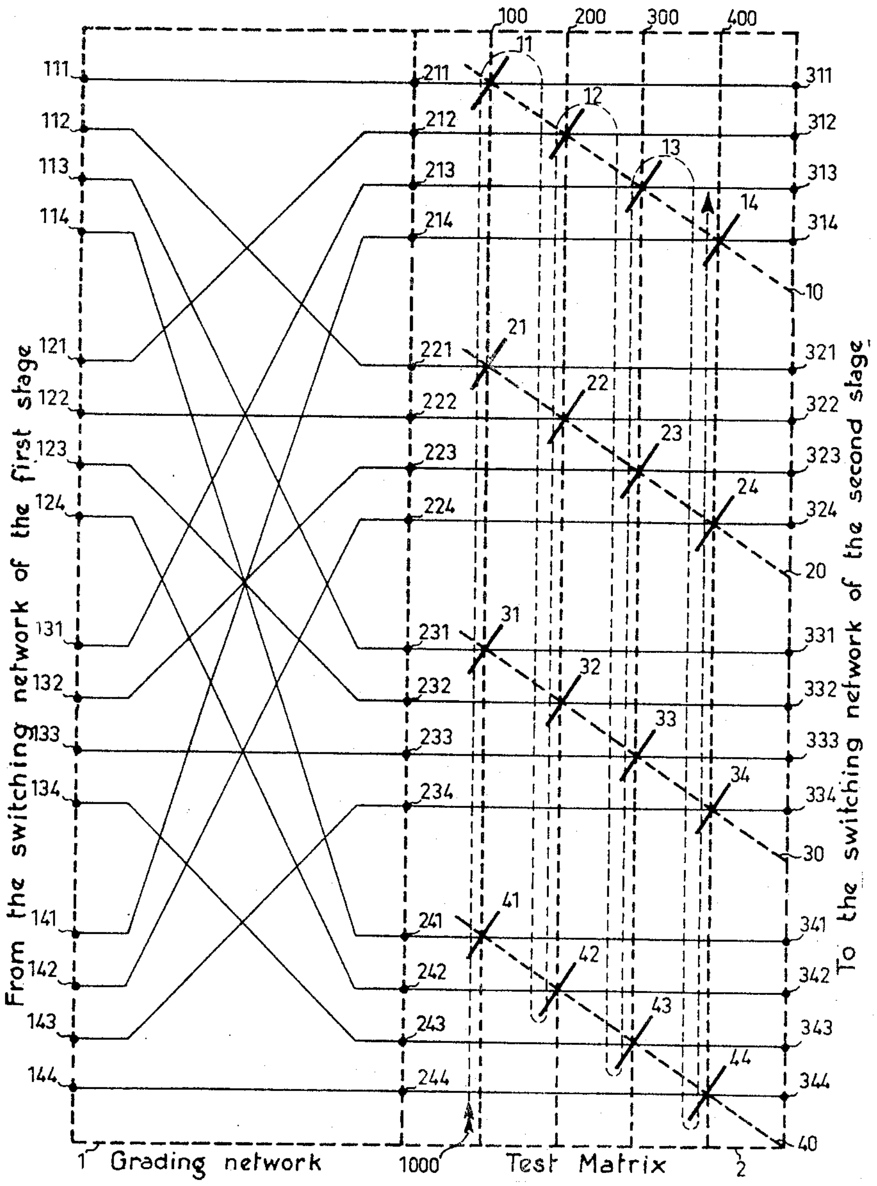
FIG. 1 is a diagram showing all the circuits to be made by means of the multi-level printed card according to the invention.

FIG. 1 is a diagram showing the circuit to be made by means of the three-level printed card according to the invention.

To simplify the explanation, it has been assumed that the grading network 1 which is to be made comprises four groups ($m=4$) of four input terminals ($n=4$) 111 to 114, 121 to 124, 131 to 134, 141 to 144 for connection to four groups of four output terminals 211 to 214, 221 to 224, 231 to 234, 241 to 244, so that one terminal of each of the four input groups is connected to one terminal of each of the four output groups.

For example, if we consider the first group 111–114 of input terminals, it will be seen in FIG. 1 that the input terminal 111 is connected to the output terminal 211 of the first group of output terminals, the input terminal 112 to the output terminal 221 of the second group of output terminals, the input terminal 113 to the output terminal 231 of the third group of output terminals, and the input terminal 114 to the output terminal 241 of the fourth group of output terminals.

FIG. 1 also shows the structure of the test matrix 2 associated and serially connected with the grading network 1.

The vertical lines 100, 200, 300, 400 in broken lines are the column wires of the matrix 2 and 45° lines 10, 20, 30, 40 in broken lines are the line wires.

At each point of intersection of a line and a column is disposed a rectangular hysteresis cycle magnetic core. For example, at the points of intersection of line 10 and columns 100, 200, 300, 400 there are respectively disposed the cores 11, 12, 13, 14 conventionally shown in FIG. 1 by a small thick line perpendicular to the line 10. Through the hole of each of these cores passes a column wire and a line wire which serve to place it in a given triggering position.

Through each of these cores also extends as already said an interstage junction wire through which a characteristic current will flow or not flow depending on whether the said junction wire is or is not occupied by a communication. For example, the junction wire 212–312 passes through the hole of core 12. Finally, the reading wire 1000 (in broken lines in FIG. 1) whose path must be such that the current flowing in the wire gives a magnetic field whose direction is the same for all the cores, passes through the cores of the matrix 2. From the wire 1000 is taken a signal giving the condition of idleness or occupation of the junction wire extending through the core whose position in the matrix has been denoted by a signal on a line wire and a signal on a column wire.

FIG. 2 shows the arrangement of the printed cards in relation to one another for producing the circuits shown in FIG. 1.

On the upper side of a metal frame 3 is secured a card 4 whose front (the visible surface in FIG. 2) carries the printed wires of the grading network 1.

Reference numeral 5 denotes the small auxiliary card on which are disposed the jumper wires, i.e. the parts of the grading network junctions which would intersect other junctions of the same network if they were on card 4.

On the other surface of the metal frame 3 is fixed the card 6 whose back (the non-visible surface in FIG. 2) bears the matrix 2 described hereinbefore with reference to FIG. 1.

The side 7 of the card 4 which extends beyond the frame 3 bears:

On the front: the input terminals 111 to 144 of the mixing network 1, which are connected to the output terminals of the telephone switching network of the first stage;

On the back: the output terminals 311 to 344 of the junction wires of the matrix 2, which are connected to the input terminals of the telephone switching network of the second stage.

FIG. 3 is a perspective view showing the paths followed by the printed conductors on the cards 4 and 6.

The junction of the grading network 112–221a is printed on the front of the card 4. It leads from the access terminal 112 to the output terminal 221a of the grading network. Terminals such as 221a are disposed at the points of intersection of a matrix or of a four-line and four-column checkerwork.

At the point 221a a pin 9 fixed perpendicularly to the plane of the card 4, on the backside and extending through it, has a length sufficient to extend through an aperture 8 formed in the card 6. The junction wire 15 passing through the core 21 is soldered to the end 221b of said pin 9, which therefore is on the back of the card 6. Wire 15 is a metal wire holding the core 21 in place.

The other end of the junction wire 15 is soldered to a small pin 16 perpendicular to the plane of the card 6, back, and adjacent the pin 9. Pin 16 is soldered to a connection 321c–321b printed on the front of the card 6. On the front surface of the card 6 the points such as 321c occupy positions similar to those of points such as 221a on the front surface of the card 4; the paths of the conductors, e.g., 321c–321b, on the front of the card 6 are so determined that none of these connections intersect (see FIG. 6).

A pin 17 parallel to the pin 9 connects point 321b to a point 321a situated on the back of the card 4. Point 321a is the end of a printed conductor perpendicular to the side 7 of the card 4 leading to the output terminal 321 on the back of the card 4 beneath the access terminal 121 which is situated on the front of the same card (see FIG. 5).

FIG. 4 shows the paths of the junction wires of the grading network printed on the front of the card 4.

The four groups of the four input terminals 111 to 114, 121 to 124, 131 to 134, 141 to 144 are disposed on the same line, which is the side 7 of card 4. The four groups of four output terminals 211a to 214a, 221a to 224a, 231a to 234a, 241a to 244a of the grading network are respectively disposed on four perpendiculars to the side 7 of the card 4 and form the tops of a rectangular matrix, in this case a square since there are as many junction lines by groups as there are goups. In accordance with the arrangement shown in FIG. 4, it will be seen that the terminals 111, 112, 113, 114 are respectively connected to the terminals 211a, 221a, 231a, 241a without their junctions being intersected by others.

For junctions originating from the terminals 121 to 124, only two can be printed entirely on the front of the card 4; the junctions 121–212a and 122–222a must be broken and take the jumper section paths in broken lines on the auxiliary card 5.

For the junctions originating from the terminals 131 to 134, only one is printed on the card 4; the other three 131–213a, 132–223a and 133–233a must be broken and take the jumper section paths shown in broken lines printed on the auxiliary card 5.

For the junctions originating from the terminals 141 to 144, the junctions 141–214a, 142–224a, 143–234a and 144–224a must pass over other junctions and take the paths in broken lines on the auxiliary card 5.

At the points 19 marked on the oblique line 18 are situated small conductive pins making the connection between the connections of card 4 and the connections of card 5.

It should be pointed out that the arrangement shown in FIG. 4 enables the number of junctions to be borne by the auxiliary card 5 when a grading network comprises *m* groups of *n* input terminals to be predetermined. A study of this figure will show that this number of junctions is equal to:

$$S=2+3+\ldots m=\tfrac{1}{2}m\ (m-1)-1$$

FIG. 5 shows the printed connections on the back of card 4.

In accordance with the explanations given in connection with FIG. 3, these connections are all perpendicular to the side 7 of card 4; they start from the ends 311a to 344a of the pins 17 and lead to the output terminals 311 to 344 situated opposite the input terminals 111 to 144, so as to permit the use of a double-contact connector.

For simplification, the metal pins such as 9 perpendicular to the plane of FIG. 5 are shown on the latter by reference numerals 211a to 244a, but these reference numerals denote more exactly the terminals, i.e., the soldered points at the ends of the pins 9 on the front of the card 4 (see FIG. 4).

FIG. 6 shows the printed connections on the front of the card 6. They start from the terminals 311c to 344c disposed in the form of a matrix and lead to the terminals 311b to 344b disposed in a line. Each connection conventionally has the form of an L, all the large and small arms of the L being parallel and unequal, the length of the small arms being zero for certain connections.

FIG. 6 also shows the terminals 211b to 244b which are the ends of the pins 9. This figure shows the wire 15 of FIG. 3, which extends through the core 21. The other wires extending through the cores have not been shown, since it would complicate the drawing.

As stated in the introduction, the active or passive element inserted on each junction wire for testing the latter, and which constitutes an element of the test matrix, may be other than a magnetic core. In FIG. 7 it has been assumed that the current marking the occupation of a junction line is an A.C. The test circuit 36 comprises firstly a series resonance circuit made up of the capacitor 25 and the inductance 26, and tuned to the occupation marking frequency, and secondly a detector circuit for the voltage at the terminals of the inductance, comprising a diode 27, a resistor 28 and a capacitor 29. The test circuit 36 is coupled to each junction line, for example the junction line 211–311, by a transformer 35. This test matrix crosspoint is known per se in the art and is described, for example, in French Patent No. 1,213,815 of October 29, 1958. A test matrix crosspoint is then activated by a pulse on the line wire 10 corresponding thereto and by pulses on all the column wires 100 except the one corresponding to the intersection point. If the junction wire corresponding to the designated crosspoint is occupied, a pulse is taken from the column wire of this crosspoint.

FIG. 8 shows how the test circuits 36 forming the crosspoints are connected to each intersection of the matrix in the form of a suitably packaged unit between the tops of two adjacent pins 16 and 19.

When the grading network is such that its conductor paths do not intersect, the small auxiliary card can be dispensed with.

What we claim is:

1. A multi-level printed card comprising a main card and a matrix card, these two cards being parallel therebetween, a first set of input terminals aligned on the front face of the main card adjacent to a side thereof, a second set of output terminals aligned on the back face of the main card adjacent to said side, a first plurality of pins extending from the front face of the main card perpendicularly thereto and disposed at the top of the front face of the main card forming a junction for a grading network, passing through apertures in the matrix card and projecting beyond the back face of said matrix card, a second plurality of pins extending from the back face of the main card perpendicularly thereto down to the front face of the matrix card and disposed in an alignment along the side thereof opposite to the side bearing the terminal sets, a third plurality of pins projecting from the front face of the matrix card perpendicularly thereto and respectively parallel adjacent to the pins of the first plurality, a first set of conductors printed on the front face of the main card between said input terminals and the ends of the pins of the first plurality, a second set of conductors printed on the front face of the matrix card between the ends of the pins of the third plurality and the ends of the pins of the second plurality, a third set of conductors printed on the back face of the main card between the ends of the pins of the second plurality and said output terminals, a set of bridge conductors connected to the projecting ends of the associated pins in the first and third pluralities and current detectors inserted in said bridge conductors.

2. A multi-level printed card comprising a middle main card, a matrix card and a jumper card, these three cards being parallel therebetween, a first set of input terminals aligned on the front face of the main card adjacent to a side thereof, a second set of output terminals aligned on the back face of the main card adjacent to said side, a first plurality of pins extending from the front face of the main card perpendicularly thereto and disposed at the top of the front face of the main card forming a junction for a grading network, passing through apertures in the matrix card and projecting beyond the back face of said matrix card, a second plurality of pins extending from the front face of the main card perpendicularly thereto down to the back face of the matrix card and disposed in an alignment along the side thereof opposite to the side bearing the terminal sets, a third plurality of pins projecting from the front face of the matrix card perpendicularly thereto and respectively parallel adjacent to the pins of the first plurality, a fourth plurality of pins extending from the front face of the main card perpendicularly thereto up to the front face of the jumper card and disposed in an alignment oblique with respect to the side bearing the terminal sets, a fifth plurality of pins extending from the front face of the main card perpendicularly thereto up to the front of the jumper card and colinear with pins of the first plurality and electrically connected to the same, a first set of conductors printed on the front face of the main card between said input terminals and the ends of the pins of the first plurality, a second set of conductors printed on the front face of the matrix card between the ends of the pins of the third plurality and the ends of the pins of the second plurality, a third set of conductors printed on the back face of the main card between the ends of the pins of the second plurality and said output terminals, a fourth set of conductors printed on the front face of the main card between the ends of the pins of the first plurality and the ends of the pins of the fourth plurality, a fifth set of conductors printed on the front face of the jumper card between the ends of the pins of the fourth plurality and the ends of the pins of the fifth plurality, a set of bridge conductors connected to the projecting ends of the associated pins in the first and third pluralities and current detectors inserted in said bridge conductors.

3. A multi-level printed card comprising a middle main card, a matrix card and a jumper card, these three cards being parallel therebetween, a first set of input terminals aligned on the front face of the main card adjacent to a side thereof, a second set of output terminals aligned on the back face of the main card adjacent to said side, a first plurality of pins extending from the front face of the main card perpendicularly thereto and disposed at the top of the front face of the main card forming a junction for a grading network, passing through apertures in the matrix card and projecting beyond the back face of said matrix card, a second plurality of pins extending from the back face of the main card perpendicularly thereto down to the front face of the matrix card and disposed in an alignment along the side thereof opposite to the side bearing the terminal sets, a third plurality of pins projecting from the front face of the matrix card perpendicularly thereto and respectively parallel adjacent to the pins of the first plurality, a first set of conductors printed on the front face of the main card between said input terminals and the ends of the pins of the first plurality, a second set of conductors printed on the front face of the matrix card between the ends of the pins of the third plurality and the ends of the pins of the second plurality, a third set of conductors printed on the back face of the main card between the ends of the pins of the second plurality and said output terminals, a set of cross-connection means for preventing two printed conductors of the first set from level-crossing on the front face of the main card, each including two pins extending from the main card up to the jumper card on both sides of the intended level-crossing point and a conductor portion on the front face of said jumper card, a set of bridge conductors connected to the projecting ends of the associated pins in the first and third pluralities and current detectors inserted in said bridge conductors.

No references cited.

KATHLEEN H. CLAFFY, *Primary Examiner.*

J. J. BOSCO, *Assistant Examiner.*